United States Patent [19]

Steele

[11] 4,157,879
[45] Jun. 12, 1979

[54] PIPE REAMING TOOL

[76] Inventor: Lawrence Steele, 3199 Drinkwater Rd., R.R. #4, Duncan, B.C., Canada, V9L 3W8

[21] Appl. No.: 833,171

[22] Filed: Sep. 14, 1977

[51] Int. Cl.² .................. B23B 45/06; B23B 51/16
[52] U.S. Cl. ................................ 408/83; 408/228
[58] Field of Search ............... 408/14, 79–83, 408/205, 207, 227, 228

[56] References Cited
U.S. PATENT DOCUMENTS 3,656,521  4/1972  Czerniewicz ............... 408/228 X
3,752,593  8/1973  Fitzgerald ................... 408/82 X Primary Examiner—Travis S. McGehee
Attorney, Agent, or Firm—Robert D. Farkas

[57] ABSTRACT

A pipe reaming tool for use with a bit driver includes a hollow cylindrical member having a plurality of cutting teeth disposed along the edge of one end of the cutting member and extending outwardly therefrom. A stop member is connected to the other end for limiting the depth of the ream to a predetermined length and a rod is connected to the stop member for engagement by a bit driver for rotating the tool.

3 Claims, 6 Drawing Figures

PIPE REAMING TOOL

BACKGROUND OF THE INVENTION

The present invention relates to a pipe reaming tool. Reaming and similar tools are known in the prior art, but these tools do not provide both the uniquely configured cutting teeth disposed along the edge of a hollow cylindrical member and stop means for limiting the depth of the ream.

Among the prior art tools that have this disadvantage are those disclosed in U.S. Pat. Nos. 395,920; 771,656; 948,269; 1,352,825; 2,264,922; 2,829,543; 3,590,671; and 3,754,832.

SUMMARY OF THE INVENTION

The main object of the present invention is to provide a pipe reaming tool which overcomes the disadvantages of prior art tools and which provides uniquely configured cutting teeth and structure for limiting the depth of the ream.

This and other objects obtained by the structure of the present invention which includes a holow cylindrical cutting member having a plurality of cutting teeth disposed along the edge of one end thereof and stop means connected to the other end of the cutting member for limiting the depth of the ream to a predetermined length. A rod is connected to the stop means and projects outwardly therefrom to provide engagement by a bit driver for rotating the tool.

Having in mind the above and other objects that will be obvious from an understanding of the disclosure, the present invention comprises a combination and arrangement of parts illustrated in the presently preferred embodiments of the invention which are hereinafter set forth in sufficient detail to enable those persons skilled in the art to clearly understand the function, operation, construction and advantages of it when read in conjunction with the accompanying drawings.

BRIEF DESCRIPTION OF THE DRAWING

The invention will be described in detail, by way of example, with reference to the accompanying drawing in which.

DETAILED DESCRIPTION OF THE PREFERRED EMBODIMENTS

Figure 1:
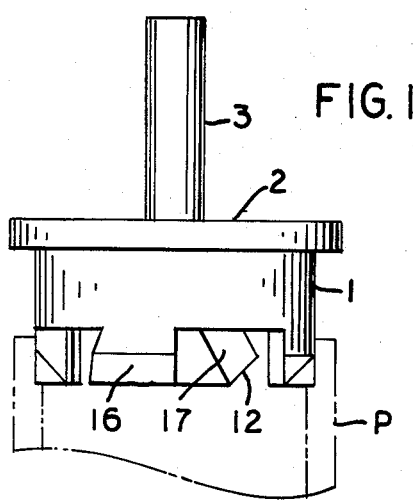
FIG. 1 is a side view of the present invention.
Figure 3:
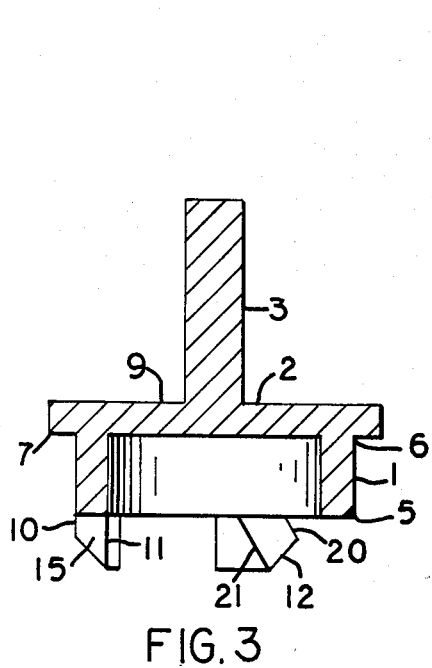
FIG. 3 is a cross-section through line 3—3 of FIG. 2.
Figure 4:
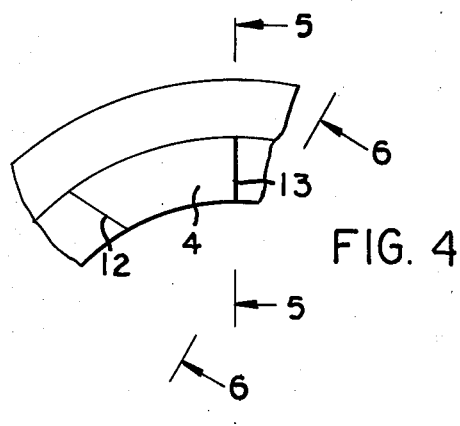
FIG. 4 is a partial bottom plan view of one tooth of FIG. 1.
Figure 5:
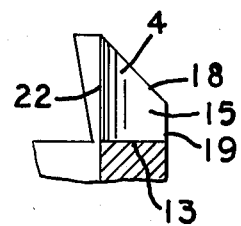
FIG. 5 is a partial elevation view taken along lines 5—5 of FIG. 4.
Figure 6:
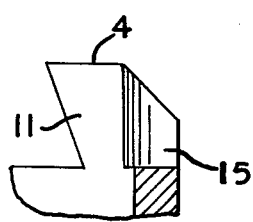
FIG. 6 is an elevation view along lines 6—6 of FIG. 4.

As shown in FIG. 1, the tool comprises a hollow cylindrical cutting member 1 which is attached at one end 6 to stop means including circular planar stop number 2, as shown in FIG. 3. On the other surface 9 of stop member 2 is connected cylindrical rod 3 which is engaged by a bit driver (not shown) such as an electric drill, lathe, etc.

Figure 2:
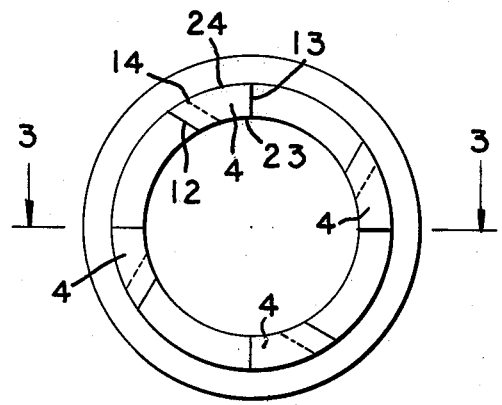
FIG. 2 is a bottom plan view of the tool of FIG. 1.

On the other end 5 of cutting member 1 are disposed cutting teeth 4 along the end 5 and extending outwardly therefrom. As shown in FIG. 2, there are four teeth 4 on the cutting tool, but more or less teeth can be used depending upon the application for the tool and the type of surface that is being cut.

In the preferred embodiment, the four teeth are configured as shown to cut into a plastic pipe P as shown in FIG. 1.

During operation, the tool reams out the inner surface of pipe P so that the pipe can be rejoined to another pipe. For example, the pipe P which has been used in a fitting, is cut off flush at the fitting and then the reamer is inserted inside the pipe so that the pipe is reamed out to a particular depth so that it can now be used again as a fitting.

The predetermined depth at which the pipe P is to be reamed out is determined by the stop means including stop member 2. As shown in FIG. 1, the reaming tool will only be permitted to ream until overlying edge 7 abuts against the pipe edge stopping any further reaming by the tool. Thus the depth of the ream is determined by the distance between end 6 of cutting member 1 and the furthermost edge 12 of cutting teeth 4.

Cutting teeth 4 will be described with reference to FIGS. 1-6 which show various views of teeth in order to facilitate the visualization and understanding thereof.

Each tooth 4 includes a first curved surface 10 which is coincident with the outer surface of cutting member 1 and a second curved surface 11 which is coincident with the inner surface of the cutting member 1. A third curved surface 16 is connected to the first and second curved surfaces at edges 23 and 24 which are coincident with the inner and outer surfaces, respectively. Edge 23 is disposed at a greater distance from end 5 of cutting member 1 than is edge 24, making third surface 16 slanting towards the longitudinal axis of cutting member 1.

Teeth 4 also each include fourth surface 15 which lies in a plane that is coincident with the longitudinal axis of the cutting member 1 and which defines trailing edges 18 and 22 with the first, second and third surfaces. A fifth surface 17 is opposite the fourth surface 15 and lies in a plane disposed at an acute angle with respect to the longitudinal axis of the cutting member 1 and intersects the first, second and third surfaces to define cutting edges 20, 21 and 12.

As a result of the fact that fifth surface 17 is at an acute angle with respect to the longitudinal axis, it slants inwardly towards the first surface 10. Thus, edge 12 overhangs edge 14 as shown in FIG. 2 while edge 18 is longitudinally aligned with edge 13, also as shown in FIG. 2.

In the preferred embodiment, the teeth 4, the cutting member 1, stop member 2 and rod 3 are integral and made of a hard material such as a metal which will cut plastic pipe.

The angles of the second surface 11 and the fifth surface 17 are chosen such that cuttings from the reamed pipe will not jam the tool as it is reaming.

While preferred embodiments of the invention have been shown by way of example in the drawing, it will be understood that the invention is in no way limited to these embodiments.

What is claimed is:

1. A pipe reaming tool for use with a bit driver, said tool comprising a hollow cylindrical cutting member having a plurality of cutting teeth disposed along the edge of one end of said cutting member and extending outwardly therefrom, wherein each of said plurality of cutting teeth having a prismatic configuration including first and second curved surfaces coincident with the outer and inner surfaces respectfully of said cutting member and a third curved surface, said third surface connected at one end thereof to said first surface at an edge disposed coincident with said outer surface at a first distance from said one end of said cutting member and connected to said second surface at an edge disposed coincident with said inner surface at a second distance from said one end, wherein said second distance is greater than said first distance, and a fourth surface, said fourth surface lying in a plane coincident with the longitudinal axis of said cutting member and intersecting said first, second and third surfaces to define trailing edges, and a fifth surface, said fifth surface being opposite said fourth surface and lying in a plane disposed at an acute angle with respect to the longitudinal axis of said cutting member and intersecting said first and second and third surfaces to define cutting edges, stop means connected to the other end of said cutting member for limiting the depth of the ream to a predetermined length, a rod, said rod connected at one end thereof to said stop means and projecting outwardly therefrom in a direction opposite to said plurality of cutting teeth for engagement by a bit driver for rotating said pipe reaming tool.

2. A tool according to claim 1, wherein said stop means comprises a planar curcular stop member having a diameter greater than the outside diameter of said cutting member and affixed to the other end thereof and concentric therewith and wherein said predetermined length is equal to the distance from the cutting edges to said other end of the cutting member.

3. A tool according to claim 2, wherein said cutting member and said rod and said cutting teeth are integral.

* * * * *